UNITED STATES PATENT OFFICE.

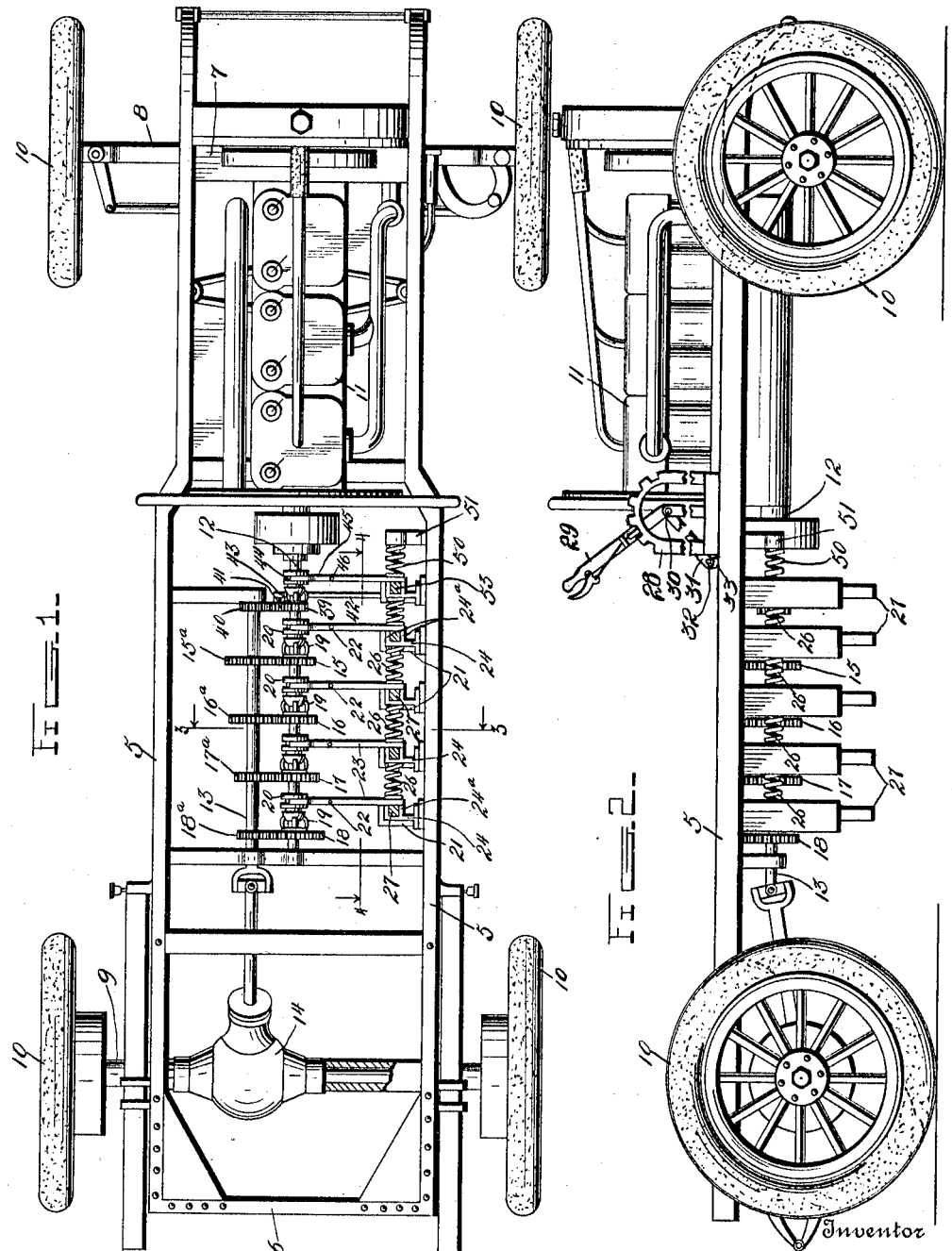

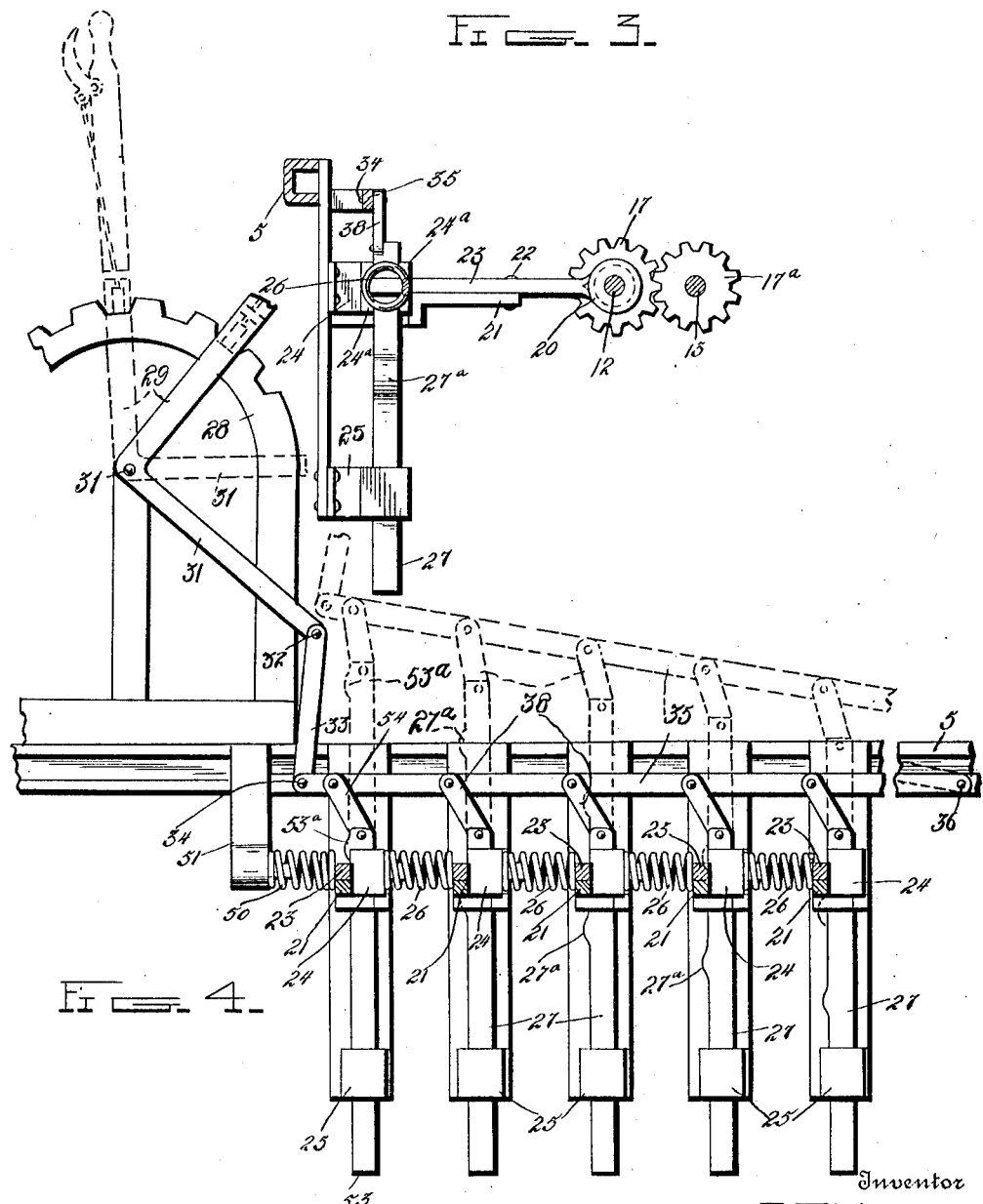

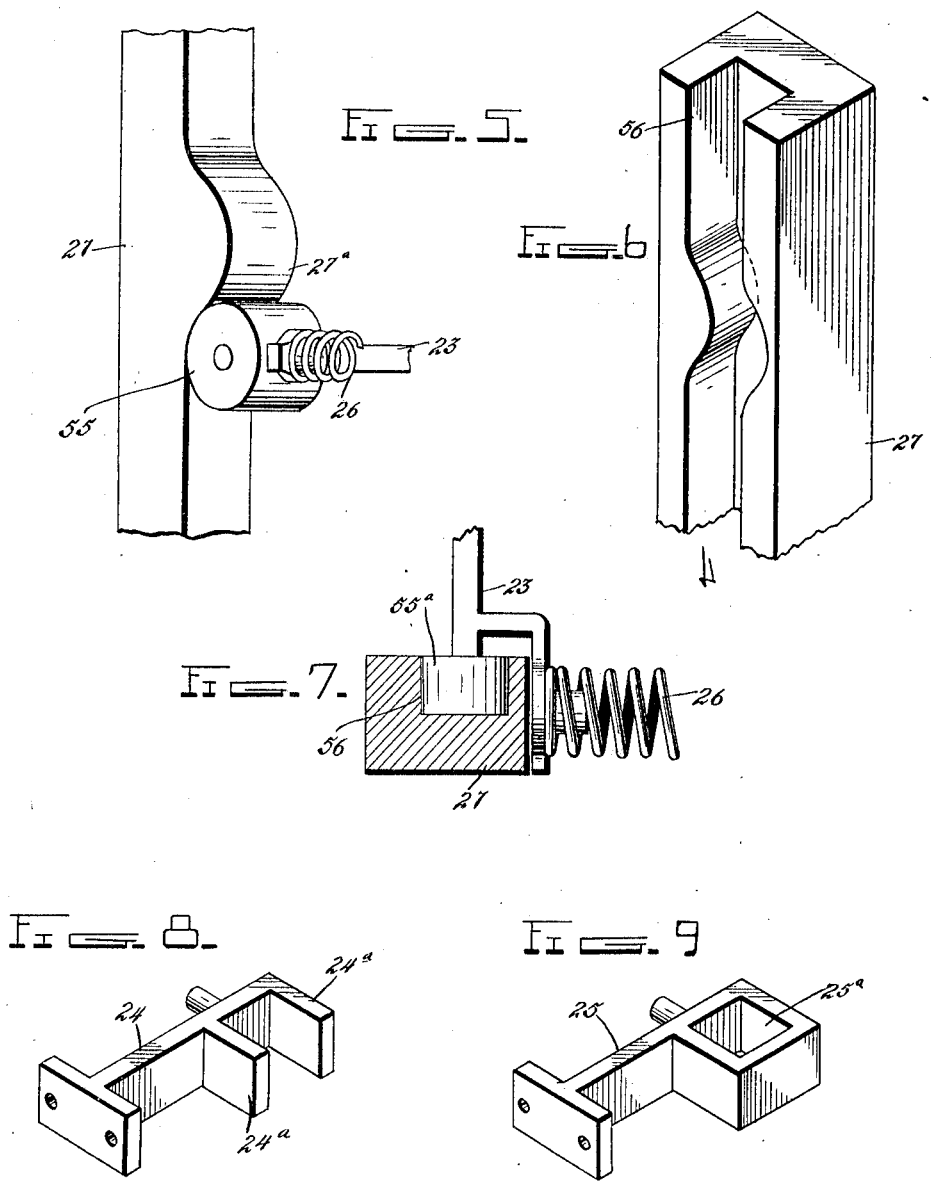

ROLAND T. WRIGHT, OF MELTONVILLE, IOWA.

TRANSMISSION-GEARING.

1,048,257.   Specification of Letters Patent.   Patented Dec. 24, 1912.

Application filed December 15, 1911. Serial No. 665,904.

*To all whom it may concern:*

Be it known that I, ROLAND T. WRIGHT, a citizen of the United States, residing at Meltonville, in the county of Worth, State of Iowa, have invented certain new and useful Improvements in Transmission-Gearing; and I do hereby declare the following to be a full, clear, and exact description of the invention, such as will enable others skilled in the art to which it appertains to make and use the same.

This invention relates to improvements in transmission gearing especially adapted for use in connection with motor vehicles.

The principal object of the invention is to provide a transmission mechanism for either varying the speed of the driven shaft or reversing the same by means of a single lever.

Another object of the invention is to provide a transmission gearing of the character described which is composed of a relatively few number of parts, and is therefore simple in construction, is positive in operation, and is cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims, may be resorted to without departing from the spirit or sacrificing any of the advantages of the invention.

In the drawings: Figure 1 is a top plan view of a motor vehicle bed frame showing my improved transmission gearing associated therewith, Fig. 2 is a side elevation thereof, Fig. 3 is a detail transverse sectional view taken on the line 3—3 of Fig. 1, Fig. 4 is a detail sectional view taken on the line 4—4 of Fig. 1, Fig. 5 is a detail perspective view showing a modified form of the shipper lever, Fig. 6 is a detail perspective view showing a modification of the cam arm, Fig. 7 is a detail plan view of the modified form of shipper lever associated with the cam arm shown in Fig. 6, said arm being shown in section, Fig. 8 is a perspective view of the upper guide arm, and Fig. 9 is a perspective view of the lower guide arm.

Like reference numerals designate corresponding parts in all the figures of the drawings.

Referring to the drawings, the bed frame of the vehicle includes the usual side sills 5—5 and end sills 6 and 7, and supported by the side sills in the usual manner are the front and rear axles 8 and 9 respectively said axles being connected to the usual ground wheels 10.

Supported upon the frame is the usual motor 11, and associated with this motor is the usual crank shaft 12 which is disposed longitudinally of the frame. Supported by the frame in parallel relation to the drive shaft 12 is a driven shaft 13 which is connected to the rear axle 9 by any preferred form of differential gearing, designated as a whole by the reference numeral 14. Loosely mounted upon the drive shaft 12 is a plurality of spaced drive gears 15, 16, 17 and 18, the diameters thereof being respectively increased in progression. Fixedly secured upon the driven shaft 11 is a plurality of spaced driven gears $15^a$, $16^a$, $17^a$, and $18^a$, said gears respectively meshing with the first mentioned gears and having diameters respectively decreasing in progression. It will thus be observed that as the drive shaft 12 rotates no motion will be imparted to the driven shaft 13.

In order to drive the driven shaft 13, there is mounted upon the drive shaft 12 adjacent each gear thereof any preferred form of clutch which is designated as a whole by the reference numeral 19. Each clutch includes the usual grooved collar 20, which is mounted to slide upon the drive shaft 12. It will also be observed that upon movement of the collar 20 in the direction of a respective drive gear, the said gear will be locked to said driven shaft, and as a result, motion will be imparted to said shaft.

In order to shift any one of the collars 20 either to or away from the respective drive gear, the following mechanism is employed: Secured to the bed frame adjacent the drive shaft 12 is a longitudinal support 21, and fulcrumed thereupon, as indicated by the reference numerals 32, are shipper levers 23, the inner end of each lever engaging with the respective collar 20 and the outer end being disposed in spaced relation to said side sill 5. Mounted upon a side sill 5 beyond each lever 23 is an upper guide 24 which is formed at its inner end with a spaced pair of forwardly extending guide arms 24ª. Also supported by the side sills 5 directly below and in spaced relation to each guide 24 is a lower guide 25, the inner end thereof being formed with an angular socket 25ª, which is disposed in vertical alinement with the guide arms 24ª of the upper guide. Disposed between the outer end of the shipper lever 23 and the forward guide 24 is a coiled spring 26 which tends to yieldingly hold the collar 20 and consequently the clutch 19 disengaged from the respective gear 18.

In order to swing the outer end of the respective shipper lever 23 forwardly to clutch the respective drive gearing to the drive shaft, there is provided a plurality of cam arms 27 of angular cross section, each arm being mounted for slidable movement within a respective pair of upper and lower guides 24 and 25, and projecting from the front face of each arm is an integral cam 27ª. All of these cams are disposed intermediate the upper and lower guides 24 and 25 respectively, and are respectively arranged at different points along the arms. Mounted upon the side sill 5 is a rack bar 28, and associated therewith is a usual hand lever 29 which is fulcrumed as shown at 30 and terminates at its lower end in a crank arm 31. The outer end of this crank arm is pivotally connected, as at 32, to one end of a link 33, and the other end of this link is pivotally connected, as at 34, to one end of a lift rod 35, the other end of this rod being pivotally connected as at 36 to the frame. A plurality of links 38 are each pivotally connected at one end to the lift rod 35, and at its other end to the upper end of a respective cam arm 27.

In order to reverse the drive, there is loosely mounted upon the drive shaft 12, a drive gear 39 and upon the driven shaft 13, there is fixedly mounted a drive gear 40. An idler 41 is interposed between the gears 39 and 40, and this idler is supported by a bracket 42 carried by the side sill 5 of the frame. A clutch which is designated as a whole by the reference numeral 43, is associated with the drive shaft 12 for connecting the drive axle 39 thereto. This clutch includes the usual sliding collar 44 which is mounted upon the drive shaft 12, and a shipper lever 45 is pivotally mounted, as at 46, upon the support 21. Upper and lower guides 24 and 25 are carried by the adjacent side sill 5. A coiled spring 50 is disposed in advance of the outer end of and bears against the outer end of said shipper lever, and has its other end fixedly secured to a bracket 51 carried by said side sill. A cam arm 53 is slidably mounted within the upper and lower guides 48 and 49 and the outer face thereof is formed with a cam 53ª which is normally disposed above the shipper lever 45. The upper end of this arm 53 is pivotally connected to one end of a link 54, the other end of said link being pivotally connected to the lift rod 35.

In operation, when it is desired to clutch in any one of the driving gears 15, 16, 17 or 18, the hand lever 29 is moved forwardly so as to engage with any particular notch formed in the rack 28, there being as many notches as there are clutches in the transmission mechanism. When any forward speed is desired, the hand lever 29 is shifted to a corresponding notch and as a result the pull rod 35 will be elevated and the respective cam 27ª will engage the respective shipper lever 23 and thereby swing the latter upon its pivot 22 and clutch the respective drive gear to the drive shaft 12. The first notch, however, is adapted to be engaged by the hand lever 29 when it is desired to reverse the drive. It will be readily understood that when the hand lever is engaged in the first notch the pull rod 35 will be swung downwardly on its pivot 36 and as a result, the cam 53ª will be caused to engage the shipper lever 45 and throw in the clutch for coupling the drive gear 39 to the drive shaft 12. It will furthermore be observed that only one of the drive gearings or the reversing gearing can be clutch to the drive shaft at a time.

In the modification as illustrated in Fig. 5 each shipper lever is provided at its outer end with a roller 55 adapted to be engaged by the cam of a respective cam arm, and thereby minimize any friction.

In the construction as illustrated in Figs. 6 and 7, each cam arm is formed in its inner face with a longitudinal groove 56 adapted to receive the roller 55ª of a respective shipper lever.

What is claimed is:

1. In a variable speed transmission mechanism, the combination with a main frame, of a drive shaft supported thereon a driven shaft supported on said frame and disposed in parallel relation to said drive shaft, a plurality of driving gears of different diameters loosely mounted on said driving shaft, a plurality of driven gears of different diameters fixed on said driven shaft and respectively meshing with said driving gears, clutches for the driving gears mounted on the drive shaft, a shipper lever for each clutch fulcrumed intermediate its ends upon said frame, upper and lower brackets carried by the frame and disposed in advance of the free end of each shipper lever, a cam arm slidably mounted within each pair of upper and lower guides, the outer face of each arm being formed with a cam adapted to engage the respective shipper lever upon movement in one direction of said arm, said cams being respectively disposed at different points along the respective arms, a coil spring disposed between each free end of a shipper lever and the next adjacent upper guide for normally holding the respective clutch out of engagement with its driving gear, a controlling lever, and connections between the cam arms and the lever for shifting any one of said arms upon a predetermined movement of said lever.

2. In a variable speed transmission mechanism, the combination with a main frame, of a drive shaft supported thereon, a driven shaft supported on said frame and disposed in parallel relation to said drive shaft, a plurality of driving gears of different diameters loosely mounted on said driving shaft, a plurality of driven gears of different diameters fixed on said driven shaft and respectively meshing with said driving gears, clutches for the driving gears mounted on the drive shaft, a shipper lever for each clutch fulcrumed intermediate its ends upon said frame, upper and lower guides carried by each frame and disposed in advance of the free end of each shipper lever, a cam arm slidably mounted within each pair of upper and lower guides, the outer face of each arm being formed with a cam adapted to engage a respective shipper lever upon movement in one direction of said arm, said cams being respectively disposed at different points along the arms, a coil spring disposed between each free end of a shipper lever and the next adjacent upper guide for normally holding the respective clutch out of engagement with its driving gear, a rack supported by said frame, a controlling lever fulcrumed on said rack including a crank arm, a lifting bar fulcrumed at one end above the cam arms, links respectively connecting each cam arm and the lifting bar, and a link pivotally connected at one end to the free end of the lifting bar and at its other end to the free end of the crank arm.

In testimony whereof, I affix my signature, in presence of two witnesses.

ROLAND T. WRIGHT.

Witnesses:
 CHAS. E. PEACOCK,
 LEONA LARSON.

---

Copies of this patent may be obtained for five cents each, by addressing the "Commissioner of Patents, Washington, D. C."